United States Patent [19]
Osajima et al.

[11] Patent Number: 5,704,276
[45] Date of Patent: Jan. 6, 1998

[54] SYSTEM FOR PROCESSING LIQUID FOODSTUFF OR LIQUID MEDICINE WITH A SUPERCRITICAL FLUID OF CARBON DIOXIDE

[75] Inventors: Yutaka Osajima, Fukuoka; Mituya Shimoda, Kasuya-gun; Tamotu Kawano, Ichikawa; Kunihiko Okubo, Moriyama, all of Japan

[73] Assignees: Shimadzu Corporation, Kyoto; Nippon Tansan Company, Limited, Tokyo, both of Japan

[21] Appl. No.: 639,437

[22] Filed: Apr. 29, 1996

[30] Foreign Application Priority Data

Jan. 29, 1996 [JP] Japan ................. 8-013223

[51] Int. Cl.$^6$ ................. A23L 2/42; B01D 11/00; C12G 3/02
[52] U.S. Cl. ................. 99/323.2; 261/DIG. 7; 422/255; 422/200; 210/634
[58] Field of Search ................. 99/323.2, 323.1; 261/DIG. 7; 430/255, 280; 210/634

[56] References Cited

U.S. PATENT DOCUMENTS 3,966,981  6/1976  Schultz ................. 426/430
5,043,280  8/1991  Fischer et al. ................. 422/280 X
5,520,943  5/1996  Osajima et al. ................. 426/422

FOREIGN PATENT DOCUMENTS 4-222576  8/1992  Japan.
5-207863  8/1993  Japan.
7-170965  7/1995  Japan.

*Primary Examiner*—Reginald L. Alexander
*Attorney, Agent, or Firm*—Oliff & Berridge, P.L.C.

[57] ABSTRACT

A system for continuously de-activating enzymes, sterilizing or deodorizing a liquid material such as liquid foodstuff or liquid medicine with a supercritical fluid of carbon dioxide. The system includes the following 1) a liquid material is continuously supplied from an inlet at a bottom of a processing tank; 2) micro-particles of the supercritical fluid of the carbon dioxide are formed so that a density of the supercritical fluid is smaller than that of the liquid material; 3) the micro-particles of the supercritical fluid are injected continuously into the liquid material from another inlet at the bottom of the processing tank; and 4) the liquid material and the supercritical fluid are separated into different phases at the top of the processing tank and are taken out of the processing tank separately.

6 Claims, 2 Drawing Sheets

SYSTEM FOR PROCESSING LIQUID FOODSTUFF OR LIQUID MEDICINE WITH A SUPERCRITICAL FLUID OF CARBON DIOXIDE

The present invention relates to a method of and system for continuously processing liquid material such as liquid foodstuff or liquid medicine using a supercritical fluid of carbon dioxide. The "processing" here includes: inactivating enzymes and spores in liquid foodstuffs, liquid medicines or the like; sterilizing liquid foodstuffs, liquid medicines or the like; and deodorizing the liquid foodstuffs or the like. In more detail, the present invention relates to a method and system capable of continuously inactivating enzymes, sterilizing and deodorizing with unprecedented efficiency and safety.

BACKGROUND OF THE INVENTION

There are various kinds of foodstuffs containing enzymes these days, in which sake and beer are typical examples. Sake is generally produced through the following steps: in the first step, fermented rice is compressed and filtered to obtain shinshu (green sake); in the second step, this obtained green sake is sterilized by heating and then stored; in the third step, a plural lots of stored sakes are properly mixed to determine the sake quality and the alcohol content is adjusted to the standards; in the fourth (final) step, the thus adjusted sake is again sterilized by heating and then bottled or packed. As described above, sake undergoes the heat-treatment twice in the second and forth steps in the manufacturing process to inactivate and kill bacteria therein, whereby the sake quality is prevented from deteriorating during circulation.

A problem here is that the fresh aroma of green sake is sharply reduced by the heat-treatments. Therefore, a non-heat-treated sake, or fresh sake, preserving the fresh taste and aroma is in great demand. To meet the demand, for example, the fresh sake is circulated in the market by keeping it at low temperature. Such non-heat-treated sake, however, contains enzymes such as $\alpha$-amylase and protease, which deteriorate the sake quality. The increased circulation cost due to the low temperature circulation is another problem.

With respect to muddled fruit drinks such as orange juice, it is considered that the cloud of the drink decides the quality of the drink. To maintain this cloud stably, it is required to inactivate pectin esterase. Since pectin esterase is stable to heat, a heat-treatment for inactivating the enzyme must be conducted at high-temperature (88°–99° C. or 120° C.). The heat-treatment at such high temperature, however, deteriorates the relish of the drink.

Some of the inventors of the present invention found a novel method whereby the problem accompanying the conventional method of inactivating enzymes by heat-treatment can be solved, which is disclosed in the Japanese Patent Application No. H6-180844. In the invention entitled "METHOD FOR INACTIVATING ENZYMES, MICROORGANISMS AND SPORES IN A LIQUID FOODSTUFF" disclosed in the application, a liquid foodstuff containing enzymes is contacted with carbon dioxide in a supercritical state to inactivate the enzymes. In detail, a processing tank with the liquid foodstuff contained therein is sealed and the temperature and pressure therein are maintained under predetermined conditions. Then the supercritical fluid formed into micro-particles by a filter is supplied to the processing tank, whereby the enzymes are inactivated. This method not only improves the inactivating efficiency, but also is highly safe since it is only carbon dioxide that contacts the liquid foodstuff. By this method, simultaneously, microorganisms such as lactic acid bacteria can be killed.

In the process or system disclosed in the above application, however, the inactivating or sterilizing process is not conducted continuously, but it is conducted by a so-called batch system, wherein a liquid foodstuff is stored in the processing tank, the inactivating processing is conducted on the liquid foodstuff in the tank, and then the tank is opened to air to take out the processed liquid foodstuff. Besides its low processing efficiency, the batch processing system is accompanied by a problem that, when the processing tank is opened to air, air including oxygen comes in the processing tank and the product quality deteriorates in the following process of production and after the production. To solve the problem, an additional step of removing air or oxygen must be employed in the process.

A system for continuously processing liquid foodstuffs is disclosed in the Japanese Published Unexamined Patent Application No. H4-222576, in which an extraction from a liquid foodstuff is conducted using a supercritical fluid. In the system, smelling components are extracted from soy sauce by contacting the soy sauce with a supercritical fluid. In more detail, the liquid foodstuff and the supercritical fluid of carbon dioxide are contacted in a counter-flow produced in a processing tank to remove the smelling components from the soy sauce.

It may be considered to apply the counter-flow contacting method to a continuous processing system for inactivating enzymes or sterilizing. A test, however, proved that the inactivating efficiency is very low in the counter-flow contacting method. Thus, a continuous processing system capable of inactivating enzymes with high efficiency and suitable for mass-production has been long desired.

Accordingly, the first object of the present invention is to provide a continuous processing method and system using supercritical fluid of carbon dioxide and having higher inactivating efficiency or sterilizing efficiency than the conventional continuous processing system using counter-flow contacting method.

When a supercritical fluid contacts a liquid foodstuff, not only the enzymes and bacteria in the liquid foodstuff are inactivated and killed, but also some flavor components are often extracted as a gas from the liquid foodstuff and are released to the outside of the processing tank together with the supercritical fluid through a supercritical fluid releasing system. This occurs also in a batch processing system for inactivating enzymes, such as disclosed in the above-cited patent application. As to undesirable components, as in the case of the smelling component of soy sauce which some people dislike, there is no problem. When, on the other hand, favorable components in the liquid foodstuff such as the fresh flavor of sake or juice is concerned, it is not preferable to let even a small amount of such components escape from the liquid foodstuff. Hence, the second object of the present invention is to provide a method and system whereby a flavor component extracted from a liquid foodstuff together with a supercritical fluid during a continuous process of inactivating enzymes or killing bacteria with the supercritical fluid can be retrieved. Thus the liquid foodstuff can be produced with its preferable components preserved even after the inactivating processing, or the flavor components can be taken out from the liquid foodstuff separately.

The third object of the present invention is to provide a method and system whereby the supercritical fluid of carbon dioxide used for inactivating enzymes and killing bacteria can be recovered and the running cost of the continuous processing system is minimized.

SUMMERY OF THE INVENTION

In order to achieve the above objects, the inventors of the present invention have studied intensively on a new constitution of the continuous processing system that greatly improves the processing efficiency of the batch processing method disclosed in the previous application. With special attention to the introducing manner of the supercritical fluid and the liquid material in the processing tank, the new system is accomplished successfully with far higher processing efficiency than the conventional system using the counter-flow contacting method.

Hence, the present invention provides a method of continuously processing a liquid material such as liquid foodstuff or liquid medicine with a supercritical fluid of carbon dioxide, the method comprising steps of:

the liquid material is continuously supplied from an inlet at a bottom of a processing tank;

the carbon dioxide is changed to the supercritical fluid so that a density of the supercritical fluid is smaller than that of the liquid material;

micro-particles are formed from the supercritical fluid of the carbon dioxide;

the micro-particles of the supercritical fluid are injected continuously into the liquid material from another inlet at the bottom of the processing tank; and the liquid material and the supercritical fluid are separated into different phases at the top of the processing tank and taking them out of the processing tank separately.

Further, the present invention provides a system for continuously processing a liquid material such as liquid foodstuff or liquid medicine with a supercritical fluid of carbon dioxide, the system comprising:

a processing tank;

a liquid material inlet port provided at a bottom of the processing tank for continuously supplying the liquid material into the processing tank;

means such as a controller using a level gauge for maintaining a surface level of the liquid material in the processing tank;

means such as a controller using a pump and a heater for changing the carbon dioxide into the supercritical fluid so that a density of the supercritical fluid is smaller than that of the liquid material;

means such as a filter and/or a supersonic oscillator for forming micro-particles of the supercritical fluid of the carbon dioxide;

means such as an injection port with the filter provided at the bottom of the processing tank for continuously injecting the micro-particles of the supercritical fluid into the liquid material in the processing tank;

a liquid material outlet port provided on a wall of the processing tank just below the surface level of the liquid material in the processing tank for continuously taking out the liquid material; and a supercritical fluid drainage port provided to the processing tank with an end placed above the surface level of the liquid material for continuously draining the supercritical fluid.

DESCRIPTION OF PREFERRED EMBODIMENTS

Figure 1:
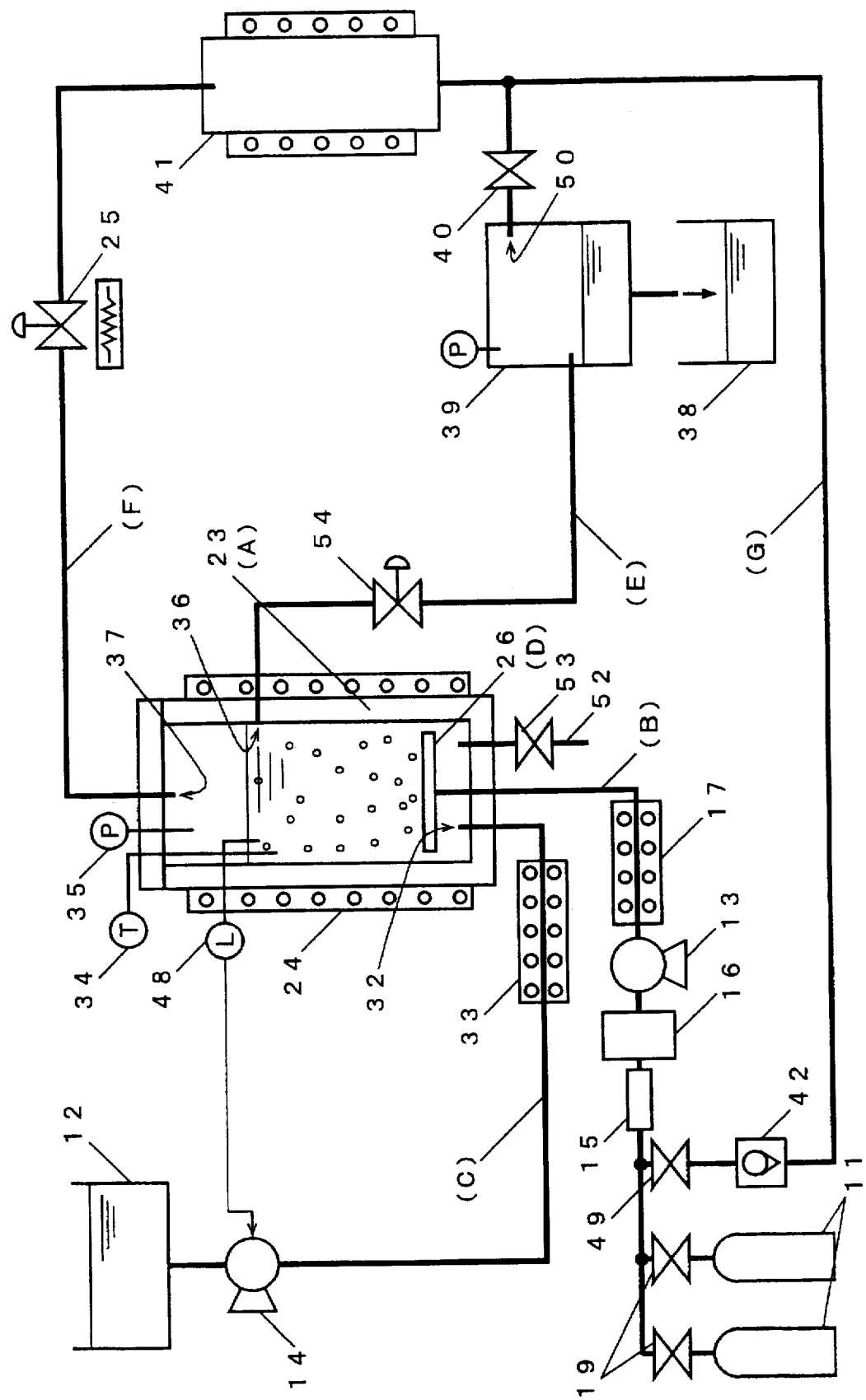
FIG. 1 is a schematic diagram of a continuous enzyme-inactivating system as one embodiment of the present invention.

The typical liquid foodstuffs to which the method or system of the present invention is applicable include: fermented liquid foodstuffs such as sake, beer, wine and soy sauce, various kinds of fruit juice and soft drinks, etc. The "liquid foodstuff" in the present invention includes tomato or other vegetable juices as well as apple, grape or various kinds of citrus fruit juices. The liquid medicines to which the continuous processing system of the present invention is applicable include various kinds of transfusion liquids, blood derivatives, nutritious drinks, etc. The present system is applicable also to demineralized water (pure water).

At first in the continuous processing, a liquid foodstuff or liquid medicine such as exemplified above is stored as a liquid material in a material tank. A pipe extends from a lower part of the material tank to an inlet port provided at the bottom of a processing tank. By operating a pump disposed on the pipe properly, the liquid material is continuously supplied from the material tank to the processing tank at a constant flow rate. A heater may be attached to the pipe for preheating the liquid material.

In the present invention, carbon dioxide in the form of micro-particles in a supercritical state is used for processing the liquid material. Such a supercritical state of carbon dioxide can be obtained under a condition where the pressure is 70 to 400 atm, preferably 100 to 300 atm, more preferably 150 to 300 atm, and the temperature is 30° to 70° C., preferably 30° to 50° C. In the present invention, the density of the supercritical fluid is required to be smaller than that of the liquid material. This condition on density can be easily met by determining appropriate temperature and pressure values of the carbon dioxide within the conditions described above according to the liquid material to be processed. The carbon dioxide ($CO_2$) is supplied from a cylinder of liquefied carbon dioxide. The cylinder is connected by a pipe with a $CO_2$ injection port at the bottom of the processing tank, and on the $CO_2$ pipe are provided a cooler (if necessary), a pump and a heater. The cooler liquefies the carbon dioxide if it is gasified when it comes out of the cylinder. The heater and the pump are controlled appropriately to make the liquified carbon dioxide in a preset supercritical state when it is supplied to the processing tank.

The carbon dioxide and the liquid material should have sufficient contact with each other in the processing tank. For this purpose, in the present invention, the supercritical fluid of carbon dioxide is formed into micro-particles when it is supplied to the processing tank. Thus a filter is disposed in the $CO_2$ injection port at the bottom of the processing tank, whereby the supercritical fluid is injected into the liquid material in the form of micro-particles. It is possible, if necessary, to add a supersonic oscillator to enhance the micro-particle formation. It is further possible to use the supersonic oscillator alone in place of the filter at the $CO_2$ injection port of the processing tank, whereby the liquified carbon dioxide is adequately formed into micro-particles by the supersonic energy. The carbon dioxide in the supercritical state and thus formed into micro-particles are bubbled into the liquid material.

The processing tank is made of a pressure vessel. To regulate the temperature and pressure in the processing tank, a thermometer, a pressure gauge, a heater and a pressure control valve are provided to the processing tank. The pressure control valve is normally disposed in a supercritical fluid retrieving passage, which will be described later. By regulating the above apparatuses properly, the supercritical state of carbon dioxide can be maintained stably in the processing tank.

In the upper part of the processing tank and just below the surface level of the liquid material, an outlet port for the liquid material is provided. Owing to the configuration of the inlet port and the outlet port, the liquid material enters the processing tank from the bottom thereof and is elevated in the processing tank and is taken out from the outlet port at the proximity to the liquid surface. That is, in the present invention, the liquid material also moves from the bottom to the top together with the supercritical fluid in the processing tank. In other words, the micro-particles of the supercritical fluid and the liquid material are not in the counter-flow contact but they contact with each other while they move in the same direction (parallel-flow contact).

When the liquid material and the micro-particles of the supercritical fluid are in the parallel-flow contact as described above, the fresh micro-particles of the supercritical fluid having high enzyme-inactivating ability, sterilizing ability and deodorizing ability contact with and dissolve into the liquid material just after the liquid material enters the processing tank, whereby the enzyme-inactivating efficiency, sterilizing efficiency and deodorizing efficiency are greatly improved. In concrete, when the micro-particles of the supercritical fluid contact with enzymes and microorganisms carrying enzymes, the supercritical fluid decomposes the high-order structure of the enzymes, so that the enzymes are inactivated, the microorganisms are killed and the liquid material is deodorized effectively. After having enough contact with each other in the parallel flow, the liquid material and the micro-particles of the supercritical fluid arrive at the upper part of the processing tank, where they are separated into two phases and are taken out from respective outlet ports. Then the liquid material is sent through a product passage to a product tank as an enzyme-inactivated and sterilized product.

In the processing tank, a drainage port for the supercritical fluid is provided on the wall above the level of the liquid material. A pipe connects the drainage port and a recycle tank, which forms a retrieving passage for the supercritical fluid which often contains volatile components. A pressure control valve is provided on the supercritical fluid retrieving passage to reduce the pressure and turn the supercritical state of the carbon dioxide into the gas or liquid state when it is retrieved into the recycle tank. The pressure control valve includes a heater for compensating for the adiabatic cooling while reducing the pressure of the carbon dioxide. Another heater is provided in the recycle tank to gasify the supercritical fluid for the recycled use of the carbon dioxide. Here, if required, unnecessary volatile components may be separated and removed from the carbon dioxide. It is of course possible to recycle the carbon dioxide without changing its state, i.e., in the supercritical state, or in the liquid state. The state of the carbon dioxide can be controlled in any way by controlling the pressure control valve and the heater appropriately.

The recycle tank is connected via a recycle line to the supercritical fluid supply passage to return the carbon dioxide in the gas, liquid or supercritical state, whereby the carbon dioxide can be re-used. The recycling ratio of the carbon dioxide can be further improved by providing a de-pressurizing tank in the product passage to extract carbon dioxide dissolved in the product and return it to the recycle line.

In the second form of the present invention, the system comprises a separation tank disposed in the supercritical fluid retrieving line. The separation tank is connected with the processing tank via a pressure control valve (a second pressure control valve), and a heater is provided to the separation tank to regulate the temperature in the separation tank. By operating the separation tank heater and the second pressure control valve properly, a volatile component is extracted from the supercritical fluid. When a plurality of such separation tanks are provided, different volatile components can be separately extracted by controlling the temperature and pressure in each separation tank appropriately. If, in this case, the pressure needs to be altered between one separation tank and another, a pressure control valve is disposed between neighboring tanks. In one way, the components thus extracted can be returned to the product via a line leading to the product passage. In another way, the extracted components can be taken out through an independent outlet port as a distinct product.

The embodiments of the present invention is described in more detail referring to the drawings as follows.

Embodiment 1

FIG. 1 is a schematic diagram of a continuous enzyme-inactivating system as one embodiment of the present invention.

(A) Processing tank

In FIG. 1, a processing tank (23) is made of a pressure vessel. The temperature and pressure in the processing tank (23) respectively monitored by a thermometer (34) and a pressure gauge (35) are regulated to be constant by a heater (24) and a pressure control valve (25). The pressure control valve (25) is disposed on a supercritical fluid retrieving line which will be described later.

At the bottom of the processing tank (23) is provided an injection port with a filter (26). The average mesh size of the filter is preferably 100 μm or less, and the filter having mesh size of 20 μm or less is further preferable.

A level gauge (48) is provided in the processing tank (23). The level gauge (48) detects the level of the liquid in the processing tank (23) and sends a level signal to a pump (14). Responsive to the level signal, the pump (14) is operated to maintain the liquid level in the processing tank (23) constant. Here, instead of using the level gauge (48), the liquid level may be maintained constant by equalizing the flow of the outgoing liquid material and that of the incoming liquid material in the processing tank (23) at all time. Further, it is also possible to provide another pressure control valve (54) besides the above-described pressure control valve (25) and maintain the liquid level constant by operating the two valves (25, 54) cooperatively. By maintaining the liquid level constant, the processing time of the liquid material is maintained constant and the quality of the product is also maintained constant.

In the upper part of the processing tank (23), an outlet port (36) is provided just below the level of the liquid material. In contrast to that, an inlet port (32) for introducing the liquid material is provided at the bottom of the processing tank (23). The liquid material enters the processing tank from the inlet port (32), is elevated in the processing tank (23), and is taken out from the outlet port (36) when it comes near the surface level. A drainage pipe (52) having a valve (53) is provided at the bottom of the processing tank (23) for the convenience of the maintenance of the processing tank (23).

In the top panel of the processing tank (23) is provided a port (37) for draining the supercritical fluid, where the end of the drainage port (37) is set above the liquid level. Since the density of the supercritical fluid is smaller than that of the liquid material, the liquid material is not discharged but the supercritical fluid alone is drained from the drainage port (37).

The reaction in the processing can be made more uniform by placing a spiral partition or the like in the processing tank (23), whereby passages of the liquid material are formed in the processing tank (23) through which the liquid material and the supercritical fluid flow in parallel with sufficient contacting opportunities.

(B) Supercritical fluid supply passage

Carbon dioxide is initially stored in the liquefied state in cylinders (11). After a source valve (19) is opened, the carbon dioxide is pumped out from the cylinders (11) by a pump (13) to the processing tank (23) through a line filter (15), heater (17) and the injection port with the filter (26). If the carbon dioxide is gasified when it comes out of the cylinders, a cooler (16) is used to liquefy it. For conducting the processing stably, it is preferable to supply the carbon dioxide in the supercritical state into the processing tank (23). The present invention can be nevertheless accomplished even when the carbon dioxide is supplied to the processing tank in the subcritical state, if the carbon dioxide is fully changed to the supercritical state in the processing tank. Therefore, the subcritical fluid flowing through the supercritical fluid supply passage should be included in the "supercritical fluid" in the present description.

(C) Continuous supply passage

The liquid material is stored in a material tank (12). A pipe extends from a lower part of the material tank (12) to the inlet port (32) at the bottom of the processing tank (23). The above-described pump (14) is disposed in the pipe and is controlled to supply the liquid material to the processing tank (23) continuously at a constant rate. To the pipe is also provided a heater (33), whereby the continuously supplied liquid material is preheated to the temperature close to that in the processing tank (23).

(D) Micro-particle injection port The $CO_2$ injection port equipped with the filter (26) is placed at the bottom of the processing tank (23). The supercritical fluid supplied from the supercritical fluid supply passage is injected into the liquid material in the processing tank (23) through the filter (26), whereby the supercritical fluid is formed into micro-particles. The size of the micro-particles is determined by the mesh size of the filter (26). Since the supercritical fluid is injected into the liquid material from the bottom of the processing tank (23) in the state of micro-particles, the supercritical fluid immediately comes in large contact with the newly supplied liquid material. A supersonic oscillator may be used in addition to the filter (26) at the injection port to enhance the micro-particle formation.

(E) Product passage

To the outlet port (36) is connected a product passage leading to a product tank (38). A de-pressurizing tank (39) is disposed in the passage, where carbon dioxide dissolved in the product is gasified and extracted. The extracted $CO_2$ gas is returned via a recycle port (50) and a valve (40) to a recycle passage which will be described later.

(F) Supercritical fluid retrieving passage

To the supercritical fluid drainage port (37) is connected a supercritical fluid retrieving passage leading to a recycle tank (41). On the retrieving passage is provided a pressure control valve (25). By reducing the pressure of the fluid in this passage with the pressure control valve (25), the supercritical fluid is changed to the gas state, which is retrieved to the recycle tank (41). Here, the fluid can be retrieved either in the liquid state or in the original supercritical state by appropriately adjusting the pressure control valve (25).

(G) Recycle passage

From the recycle tank (41) extends a recycle passage communicating to the supercritical fluid supply passage. On the recycle passage are provided a check valve (42) and an on/off valve (49). Owing to the recycle passage, the recycle tank (41) serves as another carbon dioxide supply source. The consumption of carbon dioxide is minimized by using the recycled carbon dioxide as the main source and that in the cylinders (11) is used only for compensating for the shortage in the recycled carbon dioxide.

Embodiment 2

Figure 2:
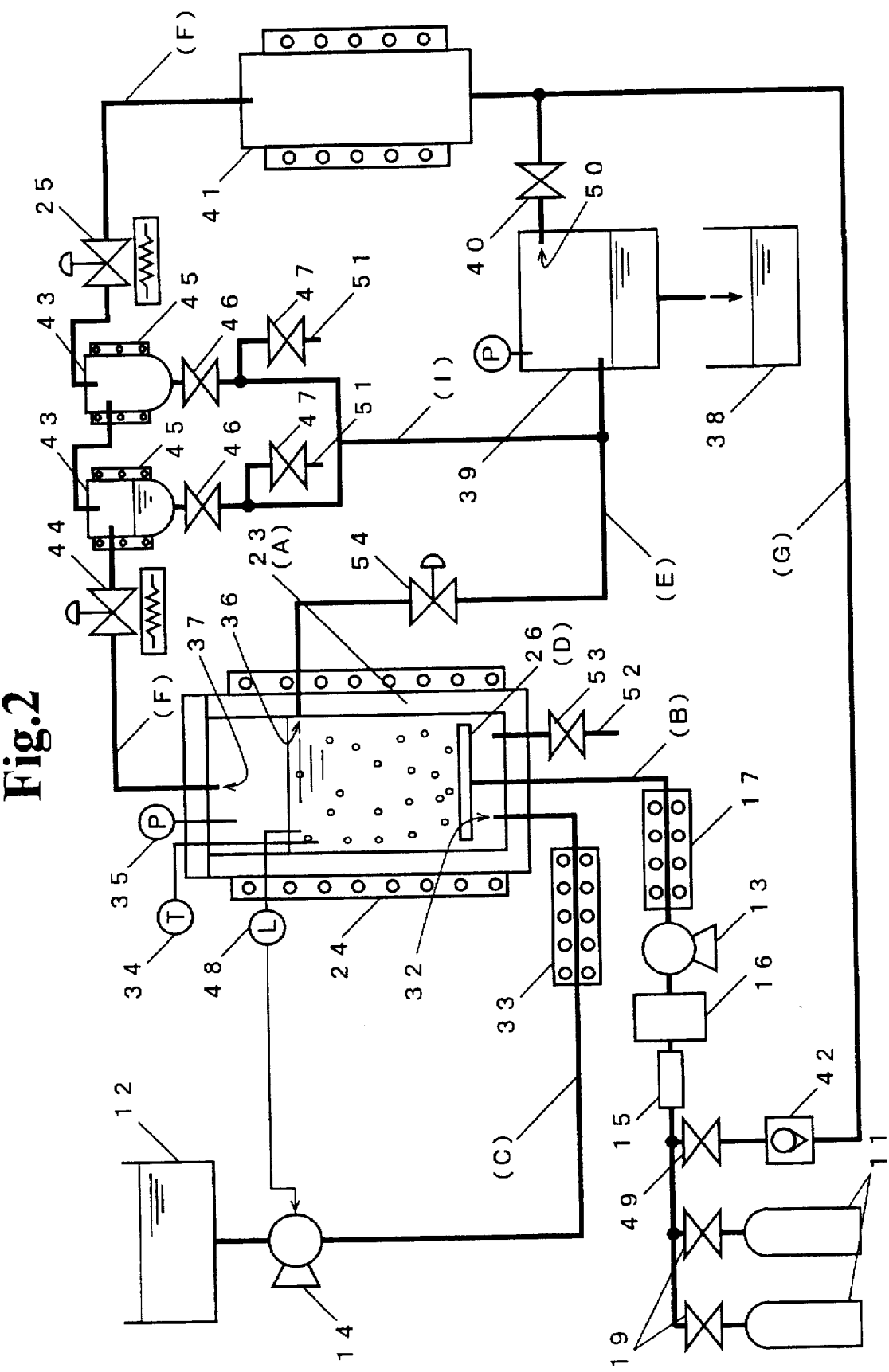
FIG. 2 is a schematic diagram of a continuous enzyme-inactivating system as another embodiment of the present invention.

FIG. 2 is a schematic diagram of a continuous enzyme-inactivating system as anther embodiment of the present invention. Since the parts (A) through (G) are substantially the same as those explained in the embodiment 1, they are denoted by the same symbols for easier reference to the explanation above.

(H) Separation tank

In the supercritical fluid retrieving passage, two separation tanks (43, 43) are disposed in series, and a pressure control valve (44) is disposed between the processing tank (23) and the first one of the separation tanks (43, 43). Another pressure control valve may be disposed in the passage between the two separation tanks (43, 43), if necessary. Each of the separation tanks (43, 43) is made of a pressure vessel, and a heater (45) is attached to each separation tank (43) for controlling the temperature therein. By setting the pressure control valve (44) and the heaters (45, 45) properly, volatile components contained in the supercritical fluid can be extracted.

(I) Volatile component collecting passage

A volatile component collecting passage provided with valves (46, 46) connects the separation tanks (43, 43) and the product passage. The volatile component extracted in each separation tank (43) is returned to the product (processed liquid material) flowing in the product passage. Instead of returning to the product, the volatile component may be taken out from a branch (51) from the volatile component collecting passage equipped with an on/off valve (47).

In the present invention, as described above, a continuous processing system with an improved enzyme-inactivating efficiency, sterilizing efficiency and deodorizing efficiency is accomplished by establishing a parallel flow of a liquid material and micro-particles of a supercritical fluid while such processing is under way there. Further, by contacting the supercritical fluid with the liquid material, not only is the liquid material inactivated and sterilized, but also volatile components or the like contained in the liquid material are gasified together with the supercritical fluid and taken out of the processing tank with the supercritical fluid releasing system. If a volatile component is such that is necessary to maintain or improve the product quality, the component is returned to the product. If, on the other hand, the volatile component is such that deteriorates the product quality, it is not returned to the product, whereby, for example, deodorization is effected. If, further, the extracted component is valuable by itself, such as favorable flavor elements, it can be taken out as another product.

Since, with respect to the carbon dioxide, the carbon dioxide is recycled and re-used in the present invention, the consumption of the carbon dioxide is minimized. It is also possible in the present invention to recycle the carbon dioxide without changing the state, i.e., maintaining the state of supercritical fluid. In this case, the energy for cooling, heating or liquefying the carbon dioxide to return it into the supercritical state is also saved.

What is claimed is:

1. A system for continuously processing a liquid material such as liquid foodstuff or liquid medicine with a supercritical fluid of carbon dioxide, the system comprising:

a processing tank;

a liquid material inlet port provided at a bottom of the processing tank for continuously supplying the liquid material into the processing tank;

means for maintaining a surface level of the liquid material in the processing tank;

means for changing the carbon dioxide into the supercritical fluid so that a density of the supercritical fluid is smaller than that of the liquid material;

means for forming micro-particles of the supercritical fluid of the carbon dioxide;

means provided at the bottom of the processing tank for continuously injecting the micro-particles of the supercritical fluid into the liquid material in the processing tank;

a liquid material outlet port provided on a wall of the processing tank just below the surface level of the liquid material in the processing tank for continuously taking out the liquid material; and a supercritical fluid drainage port provided to the processing tank with an end placed above the surface level of the liquid material for continuously draining the supercritical fluid.

2. A system according to claim 1, wherein the system further comprises a supercritical fluid retrieving passage connecting the supercritical fluid drainage port to the carbon dioxide changing means.

3. A system according to claim 2, further comprising:

a separation tank provided in the supercritical fluid retrieving passage;

means for controlling a pressure and a temperature in the separation tank for extracting volatile component included in the supercritical fluid; and an outlet provided to the separation tank for taking out the volatile component from the separation tank.

4. A system according to claim 3, wherein the outlet is connected to a passage connected to the liquid material outlet port for returning the volatile component to the liquid material.

5. A system according to claim 1, wherein the micro-particle forming means comprise a filter with a mesh size of 100 µm or less.

6. A system according to claim 1, wherein the micro-particle forming means comprise a supersonic oscillator.

* * * * *